UNITED STATES PATENT OFFICE.

CHARLES ORDONNEAU, OF COGNAC, CHARENTE, FRANCE.

PROCESS OF MAKING ALCOHOL.

SPECIFICATION forming part of Letters Patent No. 347,731, dated August 17, 1886.

Application filed March 19, 1886. Serial No. 195,864. (No specimens.) Patented in France September 16, 1885, No. 171,208; in Belgium October 7, 1885, No. 70,416, and in England October 8, 1885, No. 11,970.

*To all whom it may concern:*

Be it known that I, CHARLES ORDONNEAU, chemist, of Cognac, Department of Charente, in the Republic of France, have invented an Improvement in the Process of Making Alcohol, (for which I have obtained Letters Patent of France September 16, 1885, No. 171,208; Belgium, October 7, 1885, No. 70,416; England, October 8, 1885, No. 11,970;) and I do hereby declare that the following is a full and exact description thereof.

The quality of alcohol as brought to market does not depend on the amount of oil it contains, but on the nature of such oil. The oils found therein are, first, the oils secreted by the barm, and, second, those supplied by the alcohol-generating substance. The former are found in all alcohols used in the trade, their amount varying according to the number of purifications such alcohols have undergone. All these substances are found in corn-alcohol as well as in the alcohols obtained from beet-root, potatoes, molasses, &c., as they are all secreted by beer-barm or *mycoderma cerevisiæ*, which is solely made use of for fermentation. The other oils vary according to their respective fermentable substances, and may be expelled by boiling continued for a certain space of time, the must being boiled before fermentation. Disinfecting processes carried out by means of charcoal and purification, by means of the most improved column apparatus, tend to eliminate those odoriferous bodies; but this separation is only partial. The first purification chiefly removes the "head" bodies and the superior spirits mixed with fat acids. The succeeding purifications tend to separate the butylic and amylic alcohols, and the collidine, having a low boiling-point; but no matter in what manner the operations are carried on, an alcohol obtained by *mycoderma cerevisiæ*, when mixed with water, has always a peculiar smell, which French tasters call the "smell of three-six," and which renders some alcohols (insufficiently purified ones) quite unfit for use.

The object I sought to attain through the improved process to which this invention relates was to obtain from all alcohol-generating substances, without any exception, alcohols having a good taste, and, above all, free from the three-six taste or smell. This process is based upon the well-known facts hereinbefore stated, as well as on the following considerations:

*Description.*—It has always been believed that the essential body of objectional aroma in alcohol used in the trade is due to amylic alcohol. This I found by my investigations to be a mistake, as a considerable amount of this alcohol exists in the most-highly valued wine. The body which really causes the three-six smell to be at once perceptible is isobutylic alcohol boiling at 108° centigrade. It has a peculiar smell, which makes the alcohol dry, and consequently impairs the quality thereof. It is secreted by beer-barm. The phlegms produced by beer-barm contain at least one hundred grams of isobutylic alcohol per hectoliter of the alcohol examined. The different kinds of alcohol contain, of course, variable amounts thereof, which decrease as the alcohol approaches absolute neutrality—*i. e.*, has undergone more purifying operations.

I have observed that alcohols obtained from the same matters—viz., beet-root, barley, Indian corn, Jerusalem artichoke, potatoes, molasses, and all cereals, &c.—provided fermentation is caused by the barm that forms on the surface of fruit-juices, are totally free from isobutylic alcohol, but contain in its stead normal butylic alcohol boiling at 116° centigrade, which is a body of a pleasant taste and smell, and which is found in spirituous liquors of whatsoever kind, as well as in ciders, kirschwasser, rum, &c. Normal butylic alcohol is secreted by fruit-barm, and this barm does not produce any isobutylic alcohol. It also produces propylic, amylic, hexylic, and other similar alcohols, also fat acids similar to those produced by beer-barm, but very little collidine and oils having a moldy smell. Starting from these facts, I prepare alcohol in the following manner:

*Method of operation.*—To manufacture alcohol having a good taste, or, in other words, absolutely free from the three-six smell, from the substances usually employed, I produce barms from fruits or plants—such as apples, plums, cherries, grapes, &c.—and use such barms for the fermentation of musts. Large amounts of these barms are contained in the lees of wine, cider, kirschwasser, and other fermented fruit-liquors. It is therefore advisable to use such lees as initial ferments. The musts are those which are ordinarily made use of in the preparation of alcohol. They are the juices of plants or roots—such as the juice of beet-root, potatoes, or the like—sweet musts prepared with the grains and amylic substances by treating them with malt or with acid, and, finally, sugary solutions, such as the solutions of molasses and the refuse of sugar-houses. In order to ferment the musts of potatoes, beet-roots, &c.—that is to say, those derived from plants or roots containing sugar—the operation is as follows: Into a preparatory vat, which will hold about ten hectoliters, are poured about thirty liters of lees of wine. To this is added one hectoliter of juice at a temperature of 40° Celsius. The whole is well stirred together, and the ferment contained in the lees is left to work. At the end of a few hours fermentation is established, especially if the temperature of the liquid is maintained at about 30° Celsius. When it is very active, new juice at 30° Celsius is poured slowly over it. The fermentation should be constant, and it is necessary not to arrest it by too great an addition of must. When this preparatory vat is full, its contents are poured into a large vat of two hundred and fifty hectoliters. One has thus a base, upon which is poured, slowly at first, then rapidly, new juice. Fermentation ceases in from twelve to thirty hours, according to the size of the vat and the specific gravity (poids) of the juice. With the aid of these musts a continuous fermentation can be kept up, either by employing as ferment the fifth, or even less—the tenth—of the contents of a vat which is in full fermentation, and filling the vat gradually with juice or unfermented must as before; or in pouring the juice to be fermented upon the bottom of the vat, where the barm has settled after fermentation. For other musts—such as those made from molasses, grains by malt or acid, potatoes, &c.—a mother or preparatory vat is set into fermentation, which is afterward divided among the vats of a distillery. Each vat then contains a base, upon which the must at about 28° centigrade is gradually poured. Forty liters of lees are sufficient for six vats of one hundred and twenty-five hectoliters. A less quantity even will suffice, if they are very fresh. When the must is clear, the elliptic barm is deposited slowly at the bottom of the vat, and it is made use of for a new operation. It can also be washed with water, allowed to settle, pressed, and dried for use. Dried lees of wine may be employed. In this case they are carefully dissolved in a tepid must representing ten times their weight of liquid, and this new mixture is made use of in the same way as the liquid lees. The purification is effected in the ordinary apparatus. I obtain by this process the regular and complete fermentation of sugary liquids by the barm of fruits or elliptic barm, as well as the production of this barm. The alcohols which I produce in this manner are characterized by a special taste, and do not possess any taste of three-six, which depreciates them.

It is necessary to clean thoroughly the vats, as well as the rooms wherein the same are located, if they have been used before for the fermentation of beer-barm, so as to destroy, as far as possible, all remaining sprouts therein. The temperature may vary from 15° to 30° centigrade, without, however, exceeding the latter figure, so that the formation of *mycoderma vini* or vinegar-barm may be avoided. When the fermentation is completed, (it may last a week, yet it may be accelerated by increasing the amount of barm,) then the liquor is drawn off to undergo distillation, and the barm is collected in the same manner as when the operation is effected by means of low beer-barm, that which has the finest appearance being taken, by preference. This barm now may serve for the following operation, and so forth. It will be observed that after each purification it is advisable to slightly acidify the phlegms by means of sulphuric acid, so as to bind the collidine and other alcaloids, which partly distill during this operation. Fruit-barms are low barms which vividly act in a sour acid. Most of them appear to be constituted by the elliptic barm. If isobutylic alcohol should appear in the odoriferous oils obtained by this purifying process, which may be easily ascertained by purifying, for instance, one liter of alcohol by means of Henninger-Lebel's apparatus, with from five to ten plates, the barm ought to be rejected, the vats cleaned with lime, and the production of barm commenced again with fresh wine-lees.

*Results obtained and advantages derived from the process.*—The alcohol obtained by this new process has a pleasant smell and taste, even in the state of a phlegm. By a single purifying operation an extra fine alcohol is produced, free from any three-six smell, and having a very good taste, provided the alcohol-generating substance has been previously freed from its own particular smell by the boiling of the must; and, finally, my process enables two purifying operations to be economized in the production of alcohol, enabling first-rate liquors to be manufactured, and also adapted to be used for mixtures with brandy, wine, kirschwasser, and the like.

I do not claim the manufacture of yeast, so that it shall keep for a considerable length of time, nor, broadly, the employment of yeast obtained from wine as a fermenting agent.

I claim—

The process herein described of producing alcohol, which consists in adding in a preparatory vat lees of wine to juice of fruit in about the proportions stated, and in adding new juice after fermentation has started, and in then using the resulting mixture in a main vat as the means of fermenting fresh quantities of juice, as set forth.

CHARLES ORDONNEAU.

Witnesses:
ROBT. M. HOOPER,
ALPHONSE BLÉTRY.